United States Patent [19]

Raymond

[11] Patent Number: 4,912,802
[45] Date of Patent: Apr. 3, 1990

[54] SCREEN WIPER ASSEMBLY
[75] Inventor: Bernard Raymond, Paris, France
[73] Assignee: Valeo Systems D'Essuyage, Issy-les-Moulineaux, France
[21] Appl. No.: 286,792
[22] Filed: Dec. 20, 1988
[30] Foreign Application Priority Data
Dec. 24, 1987 [FR] France ............................ 8718153
[51] Int. Cl.⁴ ................................. B60S 1/32
[52] U.S. Cl. ......................... 15/250.23; 15/250.32; 15/250.27
[58] Field of Search ........... 15/250.21, 250.14, 250.27, 15/250.32

[56] References Cited
U.S. PATENT DOCUMENTS

| | | |
|---|---|---|
| 2,787,018 | 4/1957 | Smith . |
| 2,821,735 | 2/1958 | Perkins et al. ............... 15/250.23 |
| 2,915,772 | 12/1959 | Ziegler ........................ 15/250.23 |
| 3,525,115 | 8/1970 | Zoltok . |
| 3,551,938 | 1/1971 | Yonke .......................... 15/250.23 |
| 3,818,535 | 6/1974 | Ito ............................... 15/250.23 |
| 4,621,389 | 11/1986 | Grare .......................... 15/250.23 |
| 4,641,390 | 2/1987 | Mizhalke ..................... 15/250.23 |

FOREIGN PATENT DOCUMENTS 1531894 7/1967 France .
2553049 4/1985 France .
201745 12/1982 Japan ................. 15/250.23
1419345 12/1975 United Kingdom ........... 15/250.23

Primary Examiner—Frankie L. Stinson
Attorney, Agent, or Firm—Wenderoth, Lind & Ponack

[57] ABSTRACT

A windshield or screen wiper assembly includes a first arm which is rotatably mounted about a first fixed axis and a second arm which is mounted rotatably about a second fixed axis, substantially parallel to the first axis but offset with respect thereto. The two arms are substantially parallel to each other and their ends furthest from the axes of rotation are connected together by means of a link which is pivoted on each of these ends of the arms, while a wiper blade is connected to this link. One of arms is a driving arm while the other arm is freely mounted for rotation about its axis and is driven by the link from the driving arm. The effective lengths of the two arms between their pivots with the link and their axes of rotation are different. The assembly includes a second wiper blade the length of which is much smaller than that of the first blade, the second blade being situated closer to the axes of rotation. The orientation of the second blade with respect to the first blade is different between one extreme position of the sweep and the other, in such a way as to enable the swept area of the surface being wiped to be increased.

9 Claims, 3 Drawing Sheets

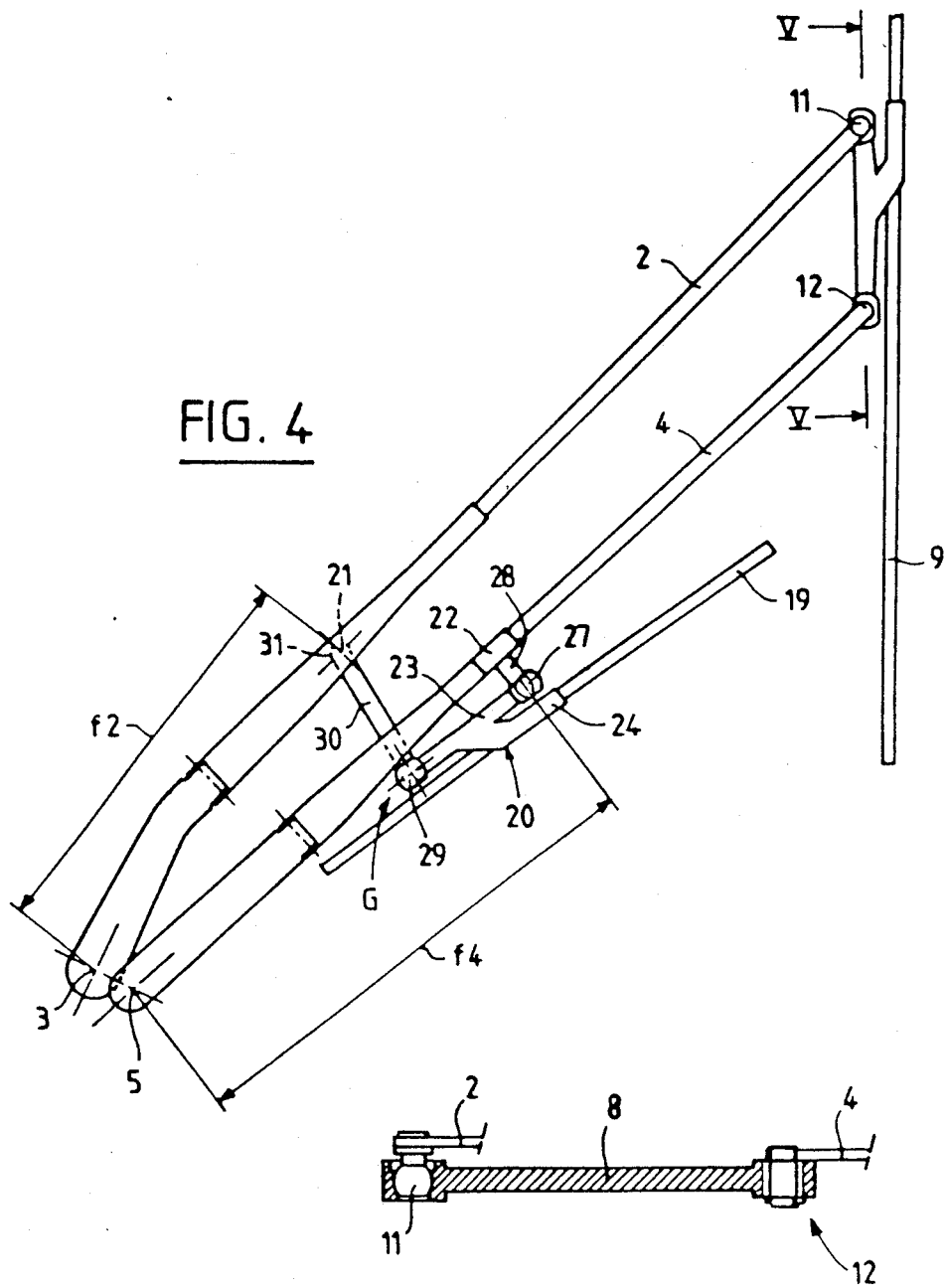

SCREEN WIPER ASSEMBLY

FIELD OF THE INVENTION

This invention relates to an assembly for wiping areas of glass, for example a windshield (windscreen) wiper, referred to herein as a "screen wiper", of the kind including a first arm rotatably mounted about a first fixed axis and a second arm mounted rotatably about a second fixed axis substantially parallel to the first axis but offset with respect thereto, the two arms being substantially parallel with each other, the ends of the arms furthest from the axes of rotation being coupled together by means of a link pivoted on each of such ends. A wiper blade is carried by the link, the assembly of the arms being adapted to be driven in oscillating rotary movement, with one of the arms being a driving arm and the other arm being mounted in free rotation about its axis and driven by the link from the driving arm. The effective lengths of the two arms between their pivots with the link and their axes of rotation are different from each other and are so chosen that, at each end of the zone of a surface swept by the assembly, the link, and therefore the wiper blade coupled with the link, assume a different orientation with respect to a plane containing the two axes of rotation of the arms, thereby increasing the area of the surface swept by the blade.

The invention is more particularly, but not exclusively, concerned with a screen wiper assembly of the single wiper type for the windshield of a vehicle.

SUMMARY OF THE INVENTION

A principal object of the invention is to provide a screen wiper assembly of the kind defined above, which allows the swept area of the surface being wiper to be substantially increased, while being of simple, robust and economical construction.

According to the invention, a screen wiper assembly of the kind defined above further includes a second wiper blade, of substantially shorter length than the first wiper blade and situated closer to the axes of rotation of the arms, with the second wiper blade including a support. Pivot means connects the support with a portion of each of the arms situated between the end of the respective arm and its axis of rotation, the pivot means being so arranged that the orientation of the second wiper blade with respect to the first wiper blade is different as between one extreme position of its sweep and the other, whereby the swept surface is increased.

Preferably, the pivot means between the second wiper blade and the two arms are so arranged that in an extreme bottom position of the sweep, the second wiper blade is substantially parallel to the first wiper blade and substantially parallel to the bottom edge of the surface to be swept, while for another extreme position in which the first wiper blade is oriented substantially at a right angle to its position in the first mentioned extreme position, the second wiper blade lies at an angle to the first wiper blade.

Advantageously, the support of the second wiper blade includes a portion substantially parallel to such second wiper blade. The assembly further includes a further link between the first arm and the support, a transverse extension fixed to the second arm, first pivot means connecting the further link to the first arm, second pivot means connecting one end of the parallel portion of the support to the transverse extension, and third pivot means connecting the other end of the parallel portion of the support to the further link, the first and third pivot means being at opposite ends of the further link.

Preferably, the second pivot means is of a spherical type, while the first and third pivot means are of a cylindrical type.

According to a preferred feature of the invention, the parallel portion of the wiper blade support and the further link together form the branches of a "compass", the apex of which contains the third pivot means coupling the further link with the support for the second wiper blade, the branches of such "compass" subtending an acute angle in one extreme position of the wiper, for example the bottom position, and a wider angle in the opposite extreme position.

Preferably, the first arm is the driving arm while the second arm is the driven arm mounted for free rotation about its axis.

The axis of rotation of the second arm may be provided on a transverse extension of a fixed support through which the axis of rotation of the first arm passes.

Preferably, the driving arm is offset transversely with respect to its axis of rotation, the assembly further comprising a foot member connecting the driving arm to its axis, the foot member being arranged to extend behind the driven arm, especially in the extreme bottom position of the sweep.

Within the scope of the structure discussed above, the invention includes other arrangements and embodiments, as will become more apparent from the particular description given in detail below and relating to a preferred embodiment, the description being given with reference to the annexed drawings, but being in no way limiting.

BRIEF DESCRIPTION OF THE DRAWINGS

FIG. 4 is a partial front view of the screen wiper assembly in its other extreme position.

Finally, FIG. 5 is a detail taken on the line V—V in FIG. 4.

DESCRIPTION OF A PREFERRED EMBODIMENT

Figure 1:
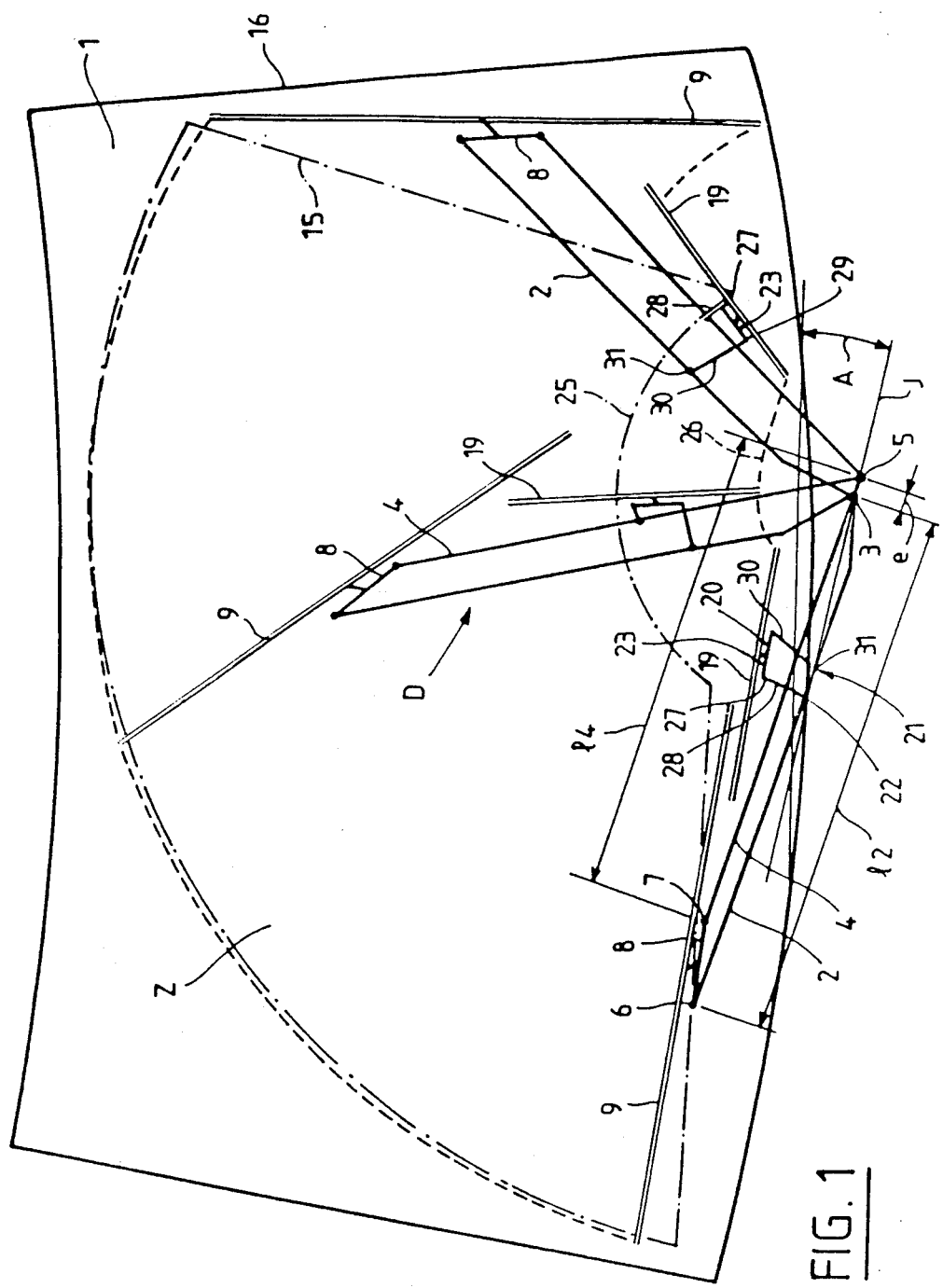
FIG. 1 is a simplified view in elevation of a screen wiper assembly of the single wiper type according to the invention, for a windshield of a vehicle, shown in three positions, namely two extreme positions and an intermediate position.

Referring to FIG. 1 of the drawings, a screen wiper assembly can be seen at D. The assembly has a single wiper for a windshield 1 of an automotive vehicle. The assembly D has been shown in three positions in full lines, so as to facilitate interpretation of the drawing, though strictly only the position of the assembly corresponding to that actually occupied at the instant under consideration should be shown in full lines.

The assembly D comprises a first arm 2 which is rotatably mounted around a first axis 3, the latter being fixed with respect to the structure of the vehicle which is equipped with the windshield 1; and a second arm 4 which is rotatably mounted about a second axis 5, the axis 5 also being fixed with respect to the structure of the vehicle.

The second axis 5 is substantially parallel to the first axis 3, but is offset therefrom by a distance e. A plane J containing the axes 3 and 5 (this plane being perpendicular to the plane of FIG. 1) is inclined at an angle A with respect to the mean direction of the bottom edge of the windshield. This angle A is preferably less than 30° and may be in the region of 0°, in which case the perpendicular plane J is substantially parallel to the mean direction of the bottom edge of the windshield.

Figure 3:
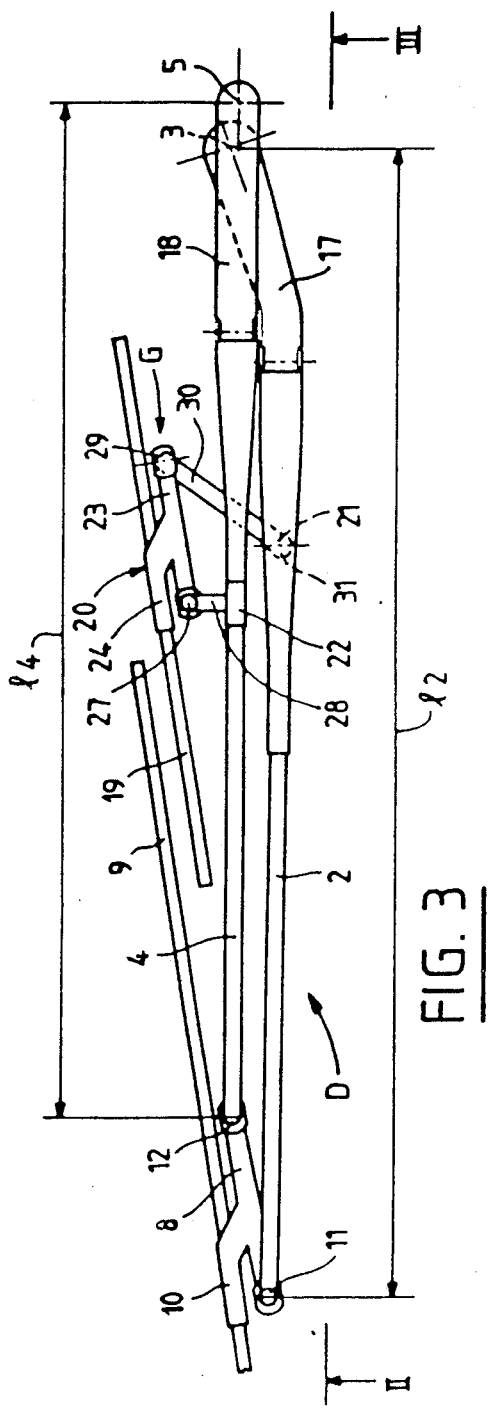
FIG. 3 is a partial front view of the screen wiper assembly in the extreme bottom position of its sweep.

The two arms 2 and 4 are substantially parallel to each other, and the outer extremities 6 and 7 of these arms, remote from the axes of rotation 3 and 5, are connected to each other by means of a link 8 which is pivoted to each end 6 and 7. A windshield wiper blade 9 is coupled to the link 8 in such a way as to take up the same orientation as link 8. The blade 9 is substantially parallel to the link 8, but is offset transversely from it as can be seen in FIG. 3. The blade 9 is secured by means of a blade holder 10 which is fixed to the link 8 or integral therewith, but which is laterally offset therefrom as can be easily seen in FIG. 3.

The two pivots of the link 8 are indicated respectively by the reference numerals 11 and 12 for the pivots on the arms 2 and 4 respectively. As is shown in detail in FIG. 5, one of these pivots, for example the pivot 11, is of the spherical type, while the other pivot (for example the pivot 12) is of the cylindrical bearing type.

The windshield wiper blade 9 is of substantial length, and constitutes the only principal blade, which explains the term "single wiper" used in connection with the assembly D shown in the drawings.

The assembly of the arms 2 and 4 is arranged to be actuated in an oscillating movement in which it passes from the extreme bottom position shown on the left of FIG. 1 to the extreme right hand position and back again. The "parked" or inoperative position corresponds to the extreme bottom position.

Figure 2:
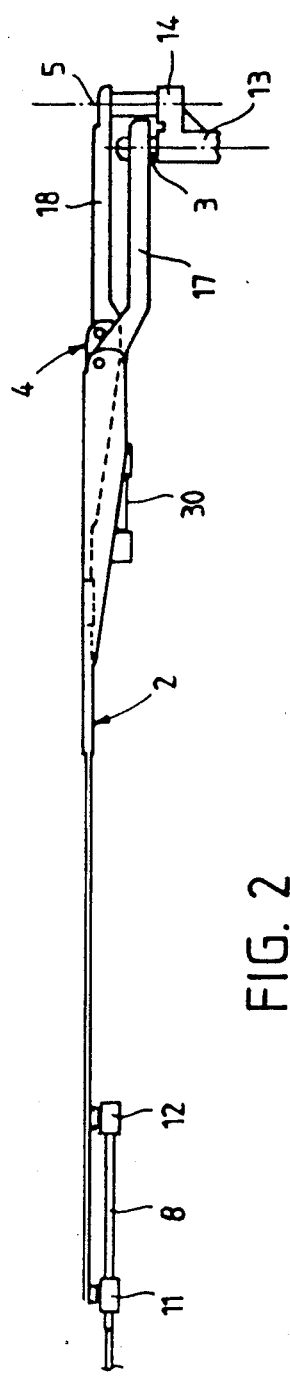
FIG. 2 is a view seen in the direction indicated by the line II—II in FIG. 3.

The arm 2 is the driving arm, and as can be seen in FIG. 2, it is driven in rotary movement about the axis 3 itself, being driven by motor means, not shown, giving alternate backward and forward movement. The axis 3 passes through a support 13 which includes a lateral extension 14 on which the axis 5 of the second arm 4 is fixed, with the arm 4 mounted for free rotation on the axis 5. The arm 4 is driven by the link 8 during the movement of the arm 2.

The effective lengths 12 and 14 of the two arms 2 and 4 respectively, between their pivots with the link 8 and their axes of rotation 3, 5 respectively, are different. These lengths are chosen in such a way that, at each end of the swept zone Z (FIG. 1), the link 8 takes up a different orientation with respect to the perpendicular plane J containing the axes 3 and 5. In this way the swept area of the windshield is increased.

In order to illustrate this increase in swept area, FIG. 1 shows in phantom lines the outline 15 of the surface which would be swept by the blade 9 if it were carried on a single arm rotating about the axis 3, with the orientation of the blade remaining constant with respect to the arm. It will be apparent that the slight diminution in the surface swept by the blade 9, evident in the region of the extreme bottom position when compared with the outline 15, is substantially smaller than the increase obtained in the swept area towards the extreme right hand position. In the latter position, the blade 9, in accordance with the invention, is much closer to the right hand edge 16 of the windshield, especially at its lower end which in the outline 15 stops well short of the corner of the windshield. The net effect is that a substantial increase of the swept surface is obtained.

In the example under consideration, the length 12 is greater than the length 14. These lengths, and also the relative disposition of the axes 3 and 5, are so chosen that the link 8, in the extreme bottom position of the wiper, is substantially parallel to the mean direction of the bottom edge of the windshield 1, while in the extreme right hand position of the wiper (FIG. 1) the link 8 is substantially parallel to the right hand edge 16 of the windshield.

The driving arm 2 is offset transversely with respect to its own axis 3, and is connected to axis 3 through a cranked foot member 17 (see FIGS. 2 and 3), which is arranged to extend below the driven arm 4 and a foot member 18 thereof. The arms 2 and 4 are pivoted on their respective foot members 17 and 18 in such a way that they can be lifted away from the windshield 1 and back towards it.

The assembly D includes a second, or auxiliary, wiper blade 19, the length of which is much smaller than that of the first or principal blade 9. The second blade 19 is located closer to the axes of rotation 3 and 5 than is the first blade 9, and includes a support 20 which is connected through a pivoted linkage G to a portion 21 of the arm 2 and a portion 22 of the arm 4, these portions 21 and 22 being intermediate between the axes of rotation and the outer ends of the respective arms.

The support 20 is similar to the link 8, and includes a portion 23 which is parallel to the blade 19 but offset therefrom, and a blade holder portion 24 which is fixed to or integral with the portion 23 but offset transversely with respect thereto. The blade 19 is carried by the holder portion 24. In the embodiment shown in the drawings, the blade 19 and the blade 9 are offset in the same direction with respect to the arms 2 and 4 respectively, in such a way that they lie over the corresponding arms when the arms are in their extreme bottom position.

The pivoted connecting means are so arranged that the orientation of the second wiper blade 19 with respect to the first wiper blade 9 will be different in one of the extreme positions of the sweep from that in the other extreme position, as can be seen in FIG. 1, in such a way as to cause the area of the swept surface to be increased.

It can be seen from FIG. 1 that, in the extreme bottom position of the wiper, the second blade 19 is substantially parallel to the first blade 9. In the other extreme position, i.e. on the right of FIG. 1, the second blade 19 is inclined with respect to the blade 9, in such a way that the lower portion of the blade 19 does not foul or contact the bottom edge of the windshield 1. Again from FIG. 1 it can be seen that the length of the blade 9 is so chosen that in the extreme right hand position, the lower end of the blade 9 is very close to the bottom edge of the windshield 1. The length chosen for the blade 9 is thus maximised, to the extent that it will not be possible to increase this length with a view to increasing still further the area of the swept surface without causing the blade to foul or contact the bottom edge of the windshield.

However, due to the provision of the second blade 19, and the fact that its angular movement is different from that of the principal blade 9, an increase is obtained in the area of the lower part of the swept zone such as to correspond substantially with the area defined between the two lower arcs of movement of blades 9 and 19, indicated at 25 and 26 in FIG. 1, of the outlines shown respectively in phantom and broken lines.

The portion 23 of the support 20 of the second blade 19 is connected at one end, by means of a spherical pivot 27, to a transverse extension 28 which is fixed to the second arm 4. This extension 28 is preferably orthogonal to the mean direction of the arm 4, and is fixed on the intermediate portion 22 thereof. The pivot 27 is located at the end of the portion 23 which is furthest from the axis 5.

The other end of the portion 23, i.e. that which is nearest to the axis 5, is connected by means of a cylindrical type pivot 29, to a link 30, the other end of which is coupled to the arm 2 by means of another cylindrical type pivot 31. The pivots 31, 27 and 29 will be referred to as first, second and third pivots respectively. The link 30 extends behind the arm 4, that is to say into the space lying between the arm 4 and the surface to be swept.

The portion 23 of the support 20, and the link 30, constitute, as it were, the branches of a "compass", the apex of which corresponds to the pivot 29. These branches subtend an acute angle in the extreme bottom position of the sweep (see FIG. 3 in particular), and a wider angle, which is substantially a right angle in this example, in the other extreme position which is seen in FIG. 4.

The operation of the windshield wiper assembly will at once be clear from the foregoing description.

In the stationary or parked position, the assembly D occupies its bottom position as seen on the left hand side of FIG. 1, with the blades 9 and 19 lying substantially parallel to each other, the blade 19 being situated lower than the blade 9 with a lower end portion of blade 9 overlapping a portion of the blade 19.

When the motor means are energised, the arm 2 is driven in rotation and itself drives the arm 4 by means of the link 8. Due to the geometry of the system and the differences in length which are adopted, the link 8 and the support 20 change their orientation with respect to the orthogonal plane J during course of their movement.

The extreme right hand position shown in FIG. 1 is eventually reached, and the assembly D begins its reverse movement towards the extreme bottom position.

As has already been explained, the windshield wiper assembly in accordance with the invention enables a substantial increase to be obtained in the area of surface swept in the lower part of the windshield.

The assembly D is of simple, robust and economical construction.

What is claimed is:

1. A screen wiper assembly comprising: a first arm rotatably mounted about a first fixed axis and a second arm mounted rotatably about a second fixed axis substantially parallel to said first axis but offset with respect thereto, said two arms being substantially parallel with each other, the ends of said arms furthest from said axes of rotation being coupled together by means of a link pivoted on each of said ends, a wiper blade carried by said link, the assembly of said arms being adapted to be driven in oscillating rotary movement, with one of said arms being a driving arm and the other arm being mounted in free rotation about its axis and driven by said link from said driving arm, the effective lengths of said two arms between their said pivots with said link and their axes of rotation being different from each other and so chosen that, at each end of the zone of a surface swept by said assembly, said link, and therefore said wiper blade coupled with said link, assume a different orientation with respect to a plane containing said two axes of rotation of said arms, thus increasing the area of the swept surface, a second wiper blade of substantially shorter length than the first said wiper blade and situated closer to said axes of rotation of said arms, said second wiper blade including a support, and pivot means connecting said support with a portion of each of said arms situated between the said end of the respective arm and its axis of rotation, said pivot means being so arranged that the orientation of said second wiper blade with respect to said first wiper blade is different as between one extreme position of its sweep and the other, thus further increasing the area of the swept surface.

2. An assembly according to claim 1, wherein said pivot means between said second wiper blade and said two arms are so arranged that in an extreme bottom position of the sweep, said second wiper blade is substantially parallel to said first wiper blade and substantially parallel to the bottom edge of the surface to be swept, while for another extreme position in which said first wiper blade is oriented substantially at a right angle to its position in the first mentioned extreme position, said second wiper blade extends at an angle to said first wiper blade.

3. An assembly according to claim 1, wherein said support of said second wiper blade includes a portion substantially parallel with said second blade, and further comprising a further link between said first arm and said support, a transverse extension fixed to said second arm, first pivot means connecting said further link to said first arm, second pivot means connecting one end of said parallel portion of said support to said transverse extension, and third pivot means connecting the other end of said parallel portion of said support to said further link, said first and third pivot means being at opposite ends of said further link.

4. An assembly according to claim 3, wherein said first pivot means is arranged so that said further link lies behind said first arm and passes behind said second arm.

5. An assembly according to claim 3, wherein said second pivot means is of a spherical type, and said first and third pivot means are of a cylindrical type.

6. An assembly according to claim 3, wherein said parallel portion of said second blade support and said further link together form the branches of a compass the apex of which contains said third pivot means coupling said further link with said support for said second wiper blade, said branches subtending an acute angle in one extreme position of said wiper assembly, for example the bottom position, and a wider angle in an opposite extreme position.

7. An assembly according to claim 1, wherein said first arm is said driving arm, and said second arm is said driven arm mounted for free rotation about its axis.

8. An assembly according to claim 7, further comprising a fixed support traversed by said axis of rotation of said first arm, said fixed support having a transverse extension, and said axis of rotation of said second arm being provided on said transverse extension.

9. An assembly according to claim 1, wherein said driving arm is offset transversely with respect to its axis of rotation, said assembly further comprising a foot member connecting said driving arm to its said axis, said foot member extending behind said driven arm, especially in the extreme bottom position of the sweep.

* * * * *